United States Patent Office 3,303,654
Patented Feb. 14, 1967

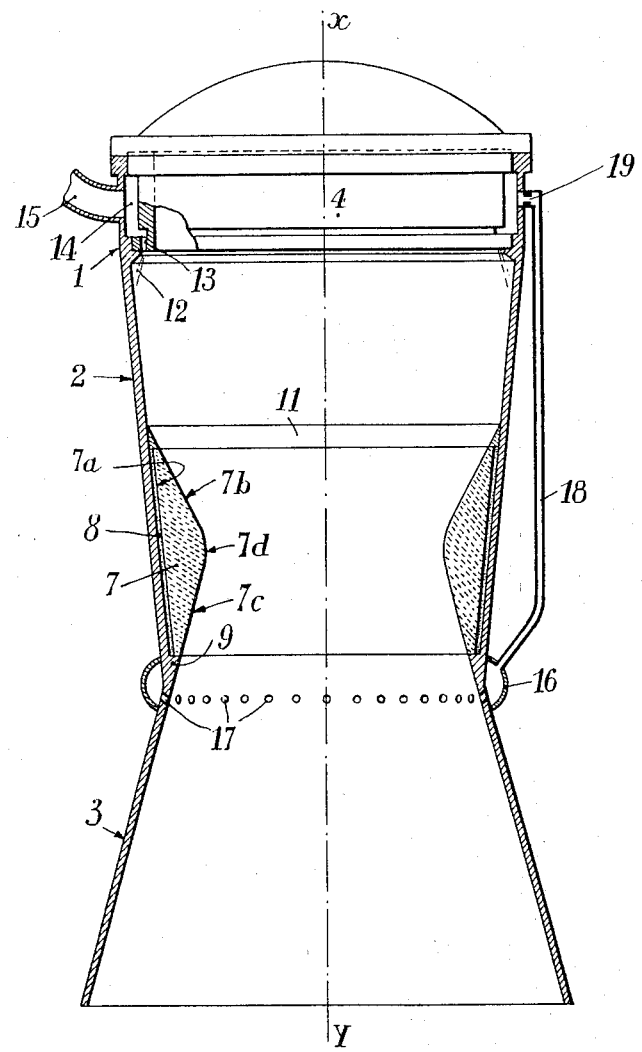

3,303,654
COMBUSTION CHAMBER FOR RAM-JETS OR ROCKET POWER UNITS EMPLOYING A COOLING FILM OF LIQUID FUEL
Heinz Bringer, Vernon, France, assignor to Etat Francais (French State) represented by the Minister of Armed Forces, Ministerial Delegation for Armament, Direction of Researches and Manufacture of Armament, Laboratory of Ballistic and Aerodynamic Researches, Vernon, France
Filed Nov. 5, 1964, Ser. No. 409,250
Claims priority, application France, Jan. 29, 1964, 961,920, Patent 1,391,927
4 Claims. (Cl. 60—258)

This invention relates to combustion chambers of the nozzle type for liquid-fuel ram-jets or like rocket power units, and is concerned more particularly with a combustion chamber with nozzle for liquid-fuel ram-jets or like rocket power units, characterized in that it comprises a metal casing comprising in turn in the direction of flow of the combustion gases, a first, support-forming section in which the injector is housed, a frusto-conical convergent wall defining a combustion chamber proper, followed by a divergent wall, and an annular graphite member having a frusto-conical external surface which is fitted in said convergent wall between the small base thereof and a section intermediate the small base and the large base of said convergent wall, the internal surface of said graphite member merging into said divergent wall of said metal casing.

The combustion chamber with nozzle according to this invention is also characterized by a great constructional simplicity, since it comprises a single, unitary metal casing, the assembly being protected against thermal effects, which are the strongest in the neck portion between the convergent and divergent wall sections by said graphite insert member.

Reference will now be made to the single figure of the accompanying drawing to describe by way of example a typical form of embodiment of the combustion chamber according to this invention, the figure showing a diagrammatical axial section thereof.

The combustion chamber with nozzle according to this invention and as shown in the drawing comprises essentially a metal casing comprising in succession in the direction of flow of the combustion gases a first section 1 constituting the support of the ejector, a frusto-conical convergent wall 2 and a divergent wall 3. These sections or elements 1, 2 and 3 constituting the casing proper are surfaces of revolution about the longitudinal axis $x-y$ which are assembled by welding.

The section 1, which, in the specific form of embodiment illustrated in the drawing, consists of a cylindrical wall, is adapted to receive the injector designated in general by the reference numeral 4, which is preferably detachable or may be welded on the wall 1.

This section 1 supporting the injector 4 may also consist, if desired, of a simple annular flange on which the injector may be fastened in any suitable manner.

Secured in the convergent frusto-conical wall portion 2 is an annular graphite member 7 having a frusto-conical external surface 7a and an internal surface comprising a convergent portion 7b followed by a divergent portion 7c, as shown. This graphite member is housed between the small base of the convergent wall portion 2 and an intermediate circular section of this wall which lies between its small or minor and large or major bases.

The graphite member 7 forming a neck or constriction 7d between the convergent and divergent surface portions 7b and 7c will thus protect the lower portion of said convergent metal wall 2 against the detrimental thermal effects which are stronger in the neck region 7d. The graphite insert member 7 is fitted in position with the interposition of a layer of refractory binding agent 8 affording a regular and uniform engagement with the inner surface of the convergent wall portion 2 while sealing the joint between the graphite member 7 and wall portion 2.

The frusto-conical graphite member 7 bears with its small or minor base upon an annular shoulder 9 formed in the zone where the convergent wall 2 merges into the divergent wall 3. This graphite insert member 7 is locked in position on said shoulder 9 by a suitably shaped ring 11 secured on the convergent wall portion 2, for example by welding.

The divergent wall portion 3 may have a frusto-conical configuration as shown in the drawing, or a pointed or ogival configuration, that is, the shape of a surface of revolution having a curved meridian and a cross-sectional contour increasing in the direction of flow of the combustion gases.

The convergent metal wall portion 2 and the graphite insert member 7 are protected against the detrimental action of combustion gases by injecting on the inner surface of the upper zone of the convergent wall portion 2 a fuel film 12 constituting a protective layer throughout the length of these elements 2 and 7. This fuel film 12 may be sprayed either from the injector proper, for example by providing orifices 13 in the lower peripheral portion thereof which communicate with an annular chamber 14 connected to a fuel feed pipe 15, as shown in the drawing, or from a member separate from the injector and designed with a view properly to spray this cooling film.

Should the thermal protection given by the divergent wall portion 3 prove inadequate for the heat developed during the operation of the ram-ject or rocket, an additional injection of fuel may be effected in the vicinity of the small base of this divergent wall portion 2. To this end, an annular chamber 16 communicating with the internal surface of the divergent wall portion 3 through orifices 17 may be provided and connected to a fuel feed pipe 18 the output of which is adjusted by means of a diaphragm 19.

If the fuel is fed through the pipe 15, the feed pipe 18 may be connected to the aforesaid annular chamber 14. However, this feed pipe 18 may, if desired, communicate directly with a source of fuel according to a different arrangement, without departing from the spirit and scope of the invention.

Besides, it is clear that this invention should not be construed as being limited by the specific form of embodiment shown, described and suggested herein, since many modifications and variations may be brought thereto without departing from the basic principles of the invention as set forth in the appended claims.

What I claim is:
1. Combustion chamber with nozzle for liquid-fuel ram-jets and rockets, which comprises a unitary metal casing comprising in succession in the direction of flow of the combustion gases a frustoconical convergent wall having a major base and a minor base and defining the combustion chamber proper, and a divergent wall, an annular graphite member having an inner surface and a frustoconical external surface comprising a major base and a minor base, said graphite member being fitted entirely within said convergent wall between the minor base of said convergent wall and an intermediate section between its minor base and its major base, the inner surface of said graphite member forming a convergent-divergent element of which the divergent section merges into the divergent wall of said metal casing, a refractory binder interposed between the external frustoconical sur- face of said annular graphite member and said convergent wall, an annular shoulder provided in the zone where the inner surfaces of said convergent and divergent walls of said casing merge into each other, and engaged by the minor base of said annular graphite member, and a ring member secured to the inner surface of said convergent wall and engaging the major base of said annular graphite member to hold said graphite member against said annular shoulder.

2. Combustion chamber as set forth in claim 1, comprising means for injection a fuel film against the internal surface of said convergent wall portion, in the zone of its large base.

3. Combustion chamber as set forth in claim 1, comprising means for injecting a fuel film against the internal surface of said divergent surface portion, in the vicinity of said annular graphite member.

4. Combustion chamber as set forth in claim 3, wherein said means for injecting said fuel film comprise a series of orifices formed through said divergent wall, an annular chamber disposed externally thereof and communicating with said orifices, and a fuel feed pipe connected to said external annular chamber.

References Cited by the Examiner

UNITED STATES PATENTS

| | | | |
|---|---|---|---|
| 2,987,874 | 6/1961 | Nicholson | 239—265.11 |
| 3,019,687 | 2/1962 | Gongwer. | |
| 3,049,877 | 8/1962 | Sherman. | |
| 3,090,198 | 5/1963 | Zeisloft | 239—265.35 |
| 3,224,191 | 12/1965 | Bratton | 60—35.6 |
| 3,233,833 | 2/1966 | Bertin et al. | 239—265.23 |
| 3,237,890 | 3/1966 | Thielman | 60—35.6 |

FOREIGN PATENTS 795,651  5/1958  Great Britain.

M. HENSON WOOD, Jr., *Primary Examiner.*

V. C. WILKS, *Assistant Examiner.*